(12) United States Patent
Balamuniandy

(10) Patent No.: US 10,931,169 B2
(45) Date of Patent: Feb. 23, 2021

(54) BUOYANT SYNCHRONY ACTUATED INDUCTANCE AC GENERATOR/BSAI AC GENERATOR

(71) Applicant: Sukumaran Balamuniandy, Sungai Buloh (MY)

(72) Inventor: Sukumaran Balamuniandy, Sungai Buloh (MY)

(*) Notice: Subject to any disclaimer, the term of this patent is extended or adjusted under 35 U.S.C. 154(b) by 0 days.

(21) Appl. No.: 16/345,216

(22) PCT Filed: Nov. 18, 2016

(86) PCT No.: PCT/MY2016/000077
§ 371 (c)(1),
(2) Date: Apr. 25, 2019

(87) PCT Pub. No.: WO2018/093243
PCT Pub. Date: May 24, 2018

(65) Prior Publication Data
US 2019/0296610 A1 Sep. 26, 2019

(51) Int. Cl.
*H02K 7/18* (2006.01)
*F03B 13/18* (2006.01)
(Continued)

(52) U.S. Cl.
CPC ......... *H02K 7/1876* (2013.01); *F03B 13/181* (2013.01); *F03C 1/00* (2013.01);
(Continued)

(58) Field of Classification Search
CPC .... H02K 7/1876; H02K 35/02; F03B 13/181; F03C 1/00; F05B 2220/7066;
(Continued)

(56) References Cited

U.S. PATENT DOCUMENTS 4,364,715 A * 12/1982 Bolding ............. F03B 13/1815
417/100
9,976,535 B2 * 5/2018 Beane ................. F03B 13/182
(Continued)

FOREIGN PATENT DOCUMENTS

JP 2010-223092 A 10/2010
JP 2013-024165 A 2/2013
(Continued)

OTHER PUBLICATIONS

Arija, S.,H., "Electrical design for a wave buoy," Department of Energy and Environment Division of Electric Power engineering, Chalmers University of Technology, pp. 1-41 (2011).

*Primary Examiner* — Charles Reid, Jr.
(74) *Attorney, Agent, or Firm* — Maschoff Brennan

(57) ABSTRACT

The Buoyant Synchrony Actuated Inductance AC Generator is a Wave Energy Converter using marine energy from Wave Power and converting it to Electricity. The Wave Energy Converter includes numerous sub-generators operating independently within its self. The Wave Energy Converter utilizes at least two balls which undergo rotational, radial, and angular motion so as to increase a frequency of movement of a plurality of magnets as they move in the vertical direction along with a wave. Solenoids are positioned in the Wave Energy Converter so as to capture the movement of the magnets and convert the movement into an electrical current.

10 Claims, 5 Drawing Sheets

(51) Int. Cl.
    *F03G 1/00*     (2006.01)
    *F03C 1/00*     (2006.01)
    *H02K 11/04*     (2016.01)

(52) U.S. Cl.
    CPC ............. *F03G 1/00* (2013.01); *H02K 7/18* (2013.01); *H02K 11/04* (2013.01); *F05B 2220/707* (2013.01); *F05B 2220/7066* (2013.01); *F05B 2240/40* (2013.01); *Y02E 10/30* (2013.01)

(58) Field of Classification Search
    CPC ........... F05B 2220/707; F05B 2240/40; Y02E 10/38; Y02E 10/30
    USPC .................................................... 290/42, 53
    See application file for complete search history.

(56) References Cited

U.S. PATENT DOCUMENTS

| | | | |
|---|---|---|---|
| 2004/0251692 A1* | 12/2004 | Leijon | F03B 13/1885 |
| | | | 290/42 |
| 2009/0160191 A1* | 6/2009 | Beane | F03B 13/20 |
| | | | 290/53 |
| 2012/0080883 A1* | 4/2012 | Hobdy | F03B 13/20 |
| | | | 290/53 |
| 2013/0008164 A1* | 1/2013 | Cunningham | F03B 13/20 |
| | | | 60/641.8 |

FOREIGN PATENT DOCUMENTS

| | | |
|---|---|---|
| JP | 2014-156791 A | 8/2014 |
| WO | 2011/066329 A1 | 6/2011 |

\* cited by examiner

BUOYANT SYNCHRONY ACTUATED INDUCTANCE AC GENERATOR/BSAI AC GENERATOR

TECHNICAL FIELD

Wave is formed when wind blows across a large expanse of water. The power derived from waves is proportional to its height and average speed.

The Buoyant Synchrony Actuated Inductance AC Generator is basically a Wave Energy Converter. This hydroelectricity producer uses the marine energy from Wave Power. It amplifies slight movements of the water surface to a higher magnitude within the Generator.

BACKGROUND ART

With serious view of the present circumstances of global warming scenario, a cheap and clean source of energy has to be identified. It also has to be a sustainable and renewable source. The answer is marine energy in the form of Wave Power which is abundant and promising.

Though there have been numerous attempts to harness this form of energy in the 1700s the momentum arose tremendously in the 1970s. This was due to disputes over oil prices and rights thus spiralling the costs of this commodity. Recent interest and advances in Wave Energy technology is about four decades old and can be considered to be in the infancy stage. Novelty designs have been introduced but only a handful have been successful.

Funding has always been a major factor, because of the high cost to produce most of these innovations. The returns are not comparable to investments.

After reading in detail about the various contraptions and designs, a flaw is quite apparent. Some point in those innovations, a generator is incorporated to generate electricity. The generators used are the standard type i.e. having rotors and stators. To achieve high output current, there should be a significant r.p.m which is quite lacking on those converters. This BSAI AC Generator uses Linear motion instead of the conventional Rotary motion of generators. Above all this, the BSAI AC Generator is made up of a large number of individual sub-generators.

This Converter is suitable for shoreline, nearshore and offshore installations.

DISCLOSURE OF INVENTION

The concept employed in developing the BSAI AC Generator is based on Faraday's Laws (1861)

Faraday's Law A voltage (emf) is "induced" in the coil by moving a magnet towards or away from a coil.

Similarly

Faraday's Law of Induction A voltage is induced in a circuit whenever relative motion exist between a conductor and a magnetic flux and the magnitude of the voltage is proportional to the rate of change of the flux.

Basic Working Principles of BSAI AC Generator (100) (Refer FIGS. 2, 4, & 5)

Undulating waves tend to displace the Ball (6) within the Bowl (5) from its neutral position. Movements of this ball triggers the motion of the ball within the Hollow Circular Channel (7). One ball undergoes rotational motion, whereas the other is radial and angular. The motion of the balls do not conform to each other and appears to be operating independently. This results to instability.

Instability is the key factor to achieve high yield current output. Meaning, the flux change between the magnets (14) and the Solenoid coils (15) is going to be numerous and erratic. Always, all the magnets will be in motion because they are all connected to the Swash Plate (9) by Tie Rods (11). At any one moment, half of the magnets will travel Downwards and the rest Upwards. This continuous variation in flux results in the flow of current through the solenoid coils which are connected to the Junction Box (17).

REFERENCES

1) Chabot Space and Science Centre
   Magnet, Coil and Meter: Generating Electricity
2) Nave, Carl R. "Faraday's Law"
   Hyper Physics. Georgia State University The Basic Components of the BSAI AC Generator and their Functions 1) Dome Assembly This dome (1) encloses the whole Converter Assembly. It is to protect the Converter Assembly from the elements, namely seawater. It has to provide a watertight sealing. For an advanced design to be considered, is to replace the air inside the dome with inert nitrogen. The smooth contours of the dome offers little resistance to wind and increase its overall stability. 2) Float The float (2) is attached to the Converter Assembly at a determined height to achieve best stability of the platform housing the Converter Assembly.

3) Top Cover

The Top Cover of the Bowl Assembly (5) is detachable for access to the Solid Ball (6). The ball is placed inside the Bowl only when the Converter is to be operated. This is to ensure the entire assembly is statically balanced at other times.

4) Rubberized Stops

The sidewalls of the Bowl (5) and the inner periphery of the Top Cover (3) are lined with rubberized material (4) to cushion and dampen the impacts of the free travelling Ball (6).

5) Bowl Assembly

It is the housing for the free travelling Ball (6) and is attached to the Swash Plate (9). The Bowl Assembly is basically a large short hollow cylinder with a slightly concave bottom and an open top.

6) Solid Ball

2 Solid Balls are used for the efficient operation of this Converter. Both are free travelling within their confined space. Their distance and duration of travel depends on the angular position of the Bowl/Swash Plate relative to the wave contour.

One Ball is within the Bowl (5) and the other within a Hollow Circular Channel (7). The Balls should be placed at their locations only when the Converter is operating. The Balls should be removed during none operational phase to maintain static balance and ease for transport, maintenance etc.

7) Hollow Circular Channel

This item is fixed onto the Swash Plate (9) and contains a Solid Ball (6) within.

8) Bowl Support

It is to support the Bowl Assembly (5) on top of the Swash Plate (9).

Note: The Bowl, Support and Swash Plate operates as a single unit.

9) Stationary Swash Plate

The Swash Plate (9) supports the Bowl Assembly (5)/Support (8) and attached to the Universal Joint Coupling Assembly (10). These are then supported by the Central Pylon (13).

The Swash Plate is able to displace itself in any vertical direction from the central axis with the help of the Universal Joint Coupling (10). Activation of its displacement is accomplished by lateral movement of the Ball (6) within the Bowl Assembly (5) which subsequently accelerates the Ball (6) within the Hollow Circular Channel (7).

10) Universal Joint Coupling Assembly

A heavy duty Universal Joint Coupling is the device connecting the Pylon (13) to the underside of the Swash Plate (9). This device is rotatable with respect to the vertical axis in all directions.

11) Tie Rods with Spherical Plain Bearings and Clevis Fittings

The Tie Rods are essential for the transfer of vertical movements of the Swash Plates (9) to the Magnets (14). Per assembly of the Tie Rod train consist of 2 separate Tie Rods connected at its ends with Spherical Plain Bearings and Clevis fittings. The Tie Rods are in 2 separate sections to compensate for deflections exerted by the Swash Plate (9) while in motion.

12) Swash Plate Limit Stop

The Swash Plate Limit Stop (12) is actually a hollow cylindrical tube around the Central Pylon (13). It functions to limit the 'Up' and 'Down' travel of the Swash Plate (9) from its 'Neutral' position as indicated in FIGS. 4 & 5.

13) Central Pylon

This robust Pylon is the main load bearing structure of the Converter Assembly together with the Universal Joint Coupling Assembly (10). It also has to support the Bowl (5), Supports (8), Hollow Circular Channel (7), Balls (6), Swash Plate (9). Tie Rods (11) and Magnets (14).

14) Magnets

Permanent Cylindrical Magnets are used for the creation of Magnetic flux. The relative movement between the Magnet and Solenoid Coil (15) produces current.

15) Solenoid Coils

This conducting coil wound around a spindle works in conjunction with the moving magnet to produce current.

The Solenoid coil as a Core is removable for maintenance etc.

16) Magnet Guide

The Magnet Guide (16) is just to keep the Magnet (14) centralized within the Solenoid Coil (15).

17) Electrical Component and Junction Box

It is the focal point for the outputs from each Unit (FIG. 7)

18) Coil Ends

Solenoid Coil ends (18) for connection to Junction Box (17).

DESCRIPTION OF DRAWINGS

To have a perspective view of the BSAI AC Generator and its workings, accompanying drawings will elaborate with precise details.

This is an all around view of the Converter.

This page also contains the Index

Figure 1:
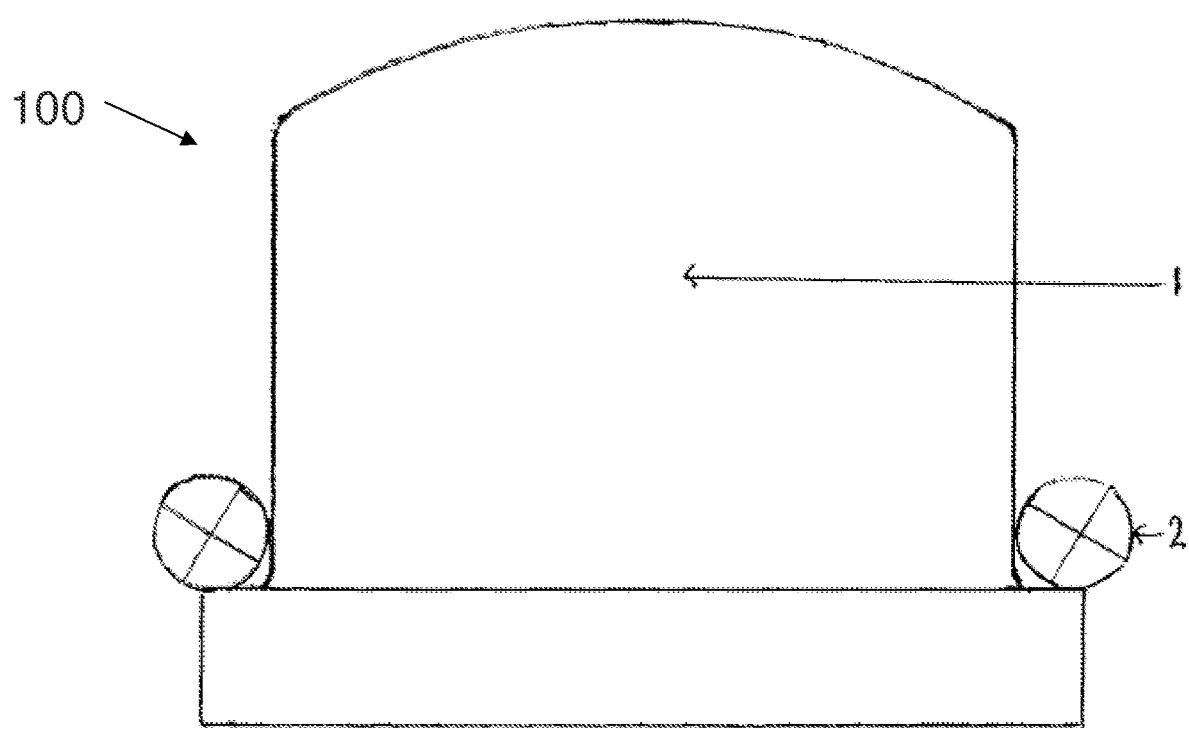
FIG. 1—Frontal/Side View of BSAI AC Generator—With Dome and Float Installed
Figure 2:
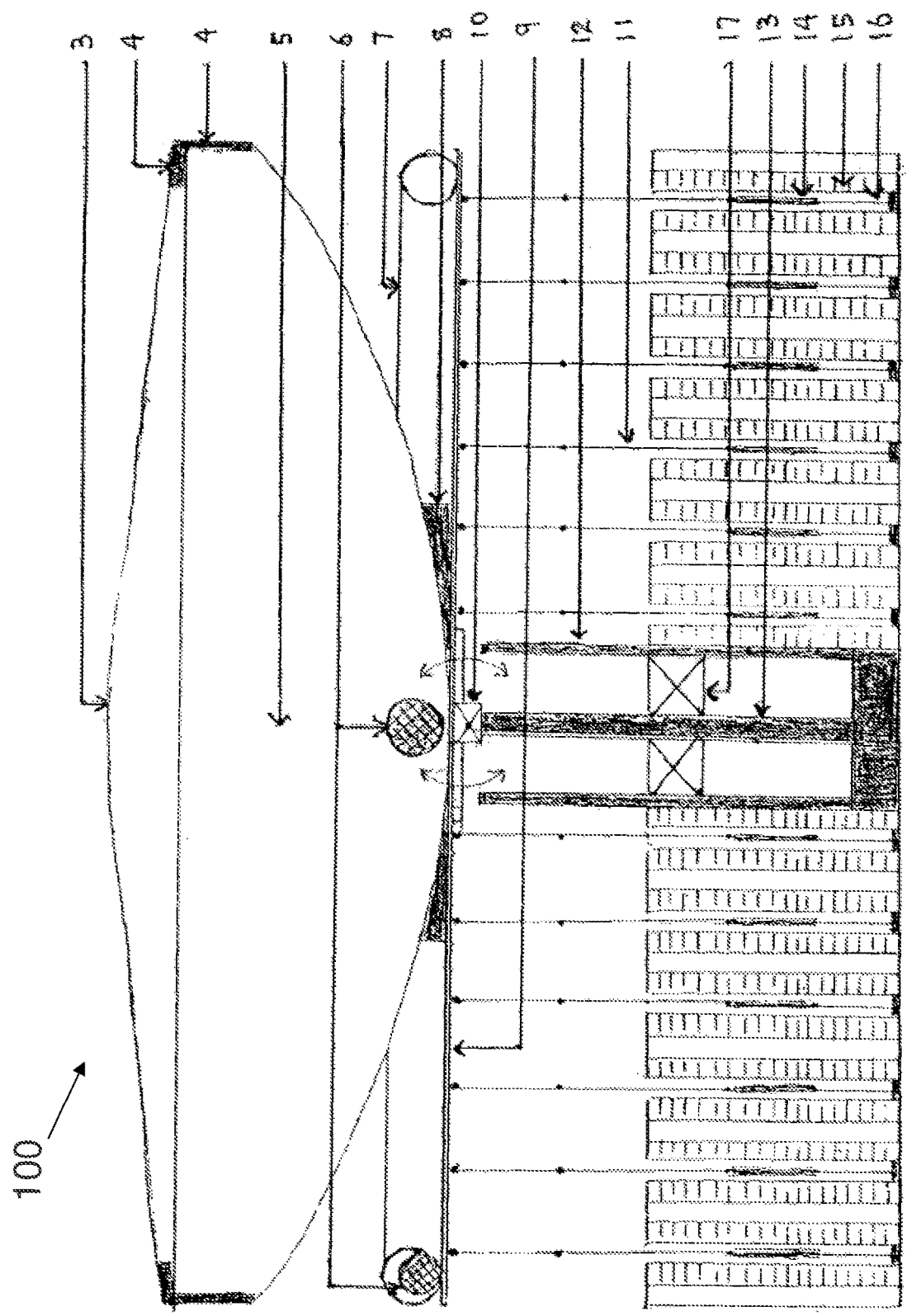

FIG. 2—Vertical Cross section View of BSAI AC Generator—Without Dome and Float

It illustrates the locations of the various components of the Converter.

Figure 3:
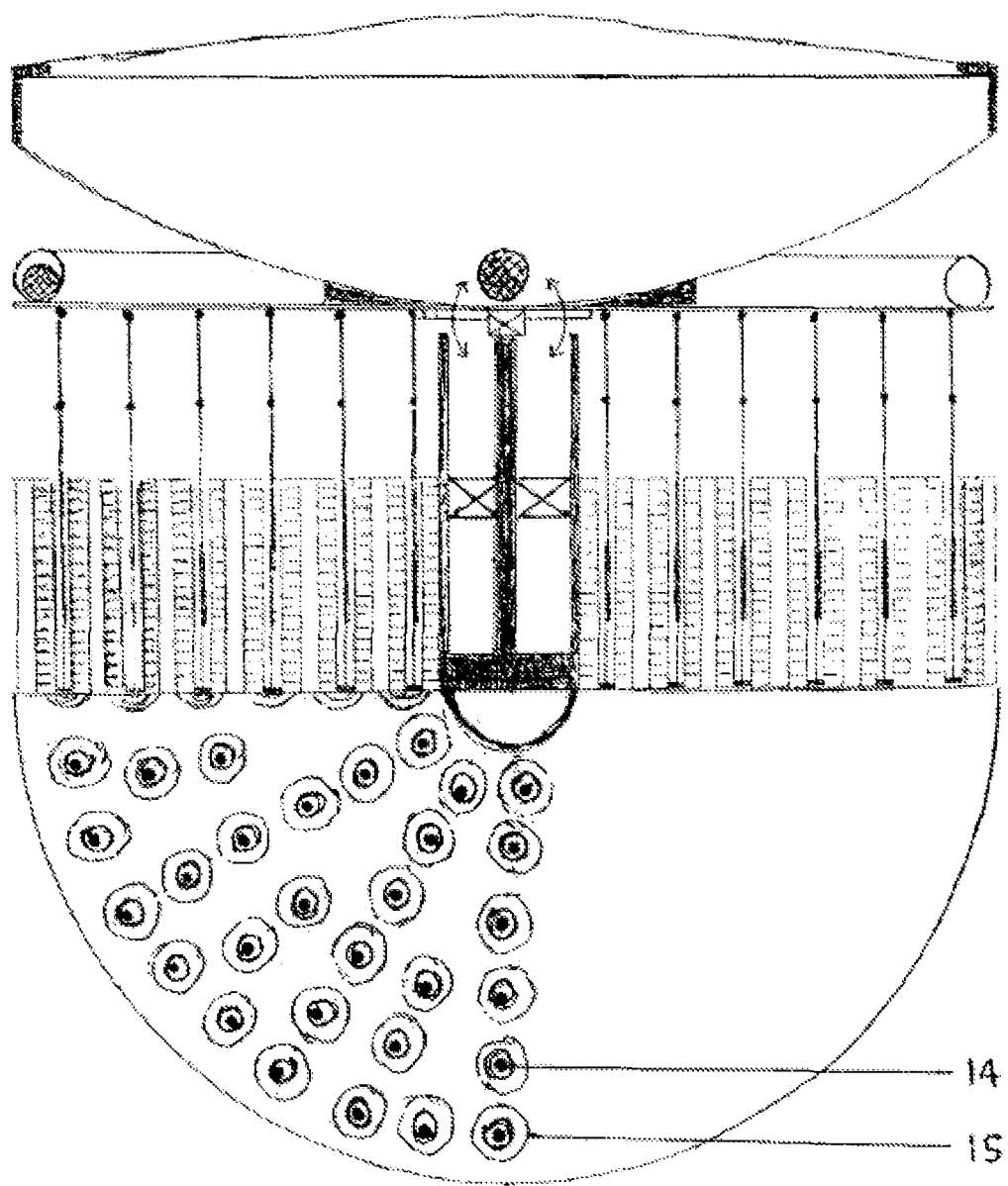

FIG. 3—Vertical Cross section View of BSAI AC Generator AND Horizontal Cross section of Base—Locations of Solenoid Coils and Magnets This drawing is a combination of 2 views joined together to indicate the distribution of the Solenoid Core/Magnets with relation to a vertical cross section of the Converter.

Figure 4:
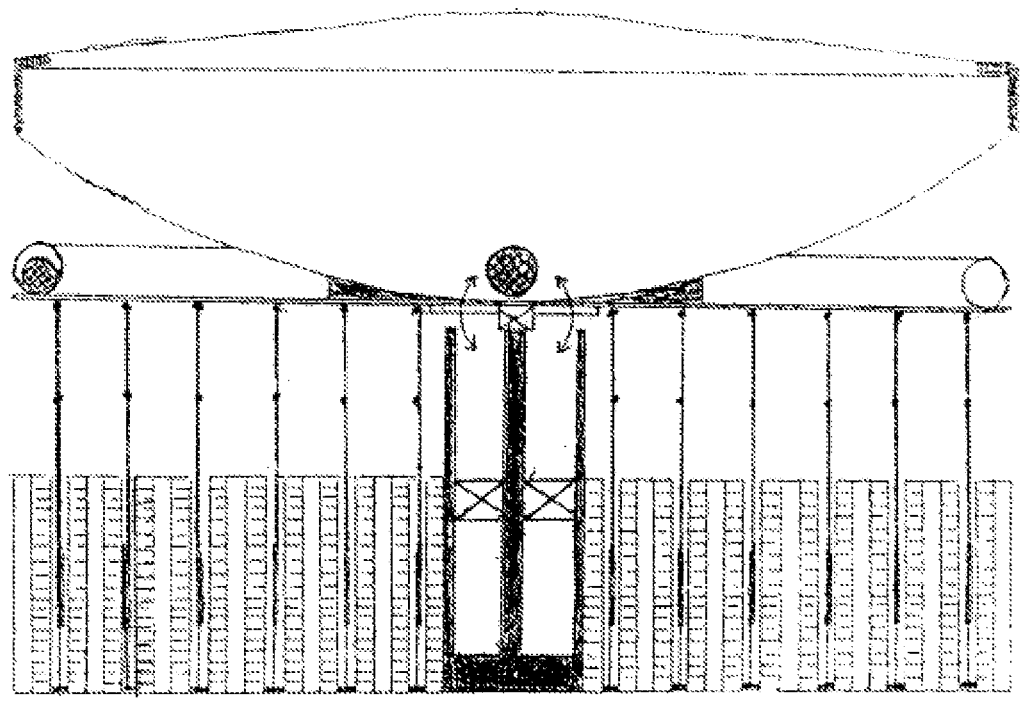
Figure 5:
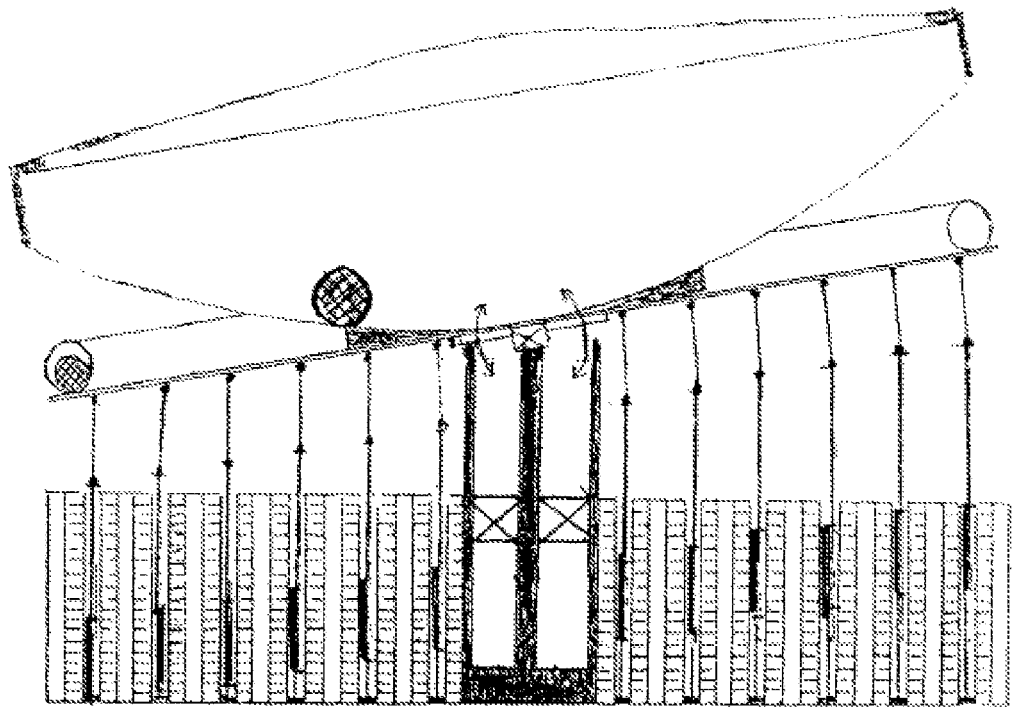

FIGS. 4 & 5—BSAI AC Generator in Neutral and Tilted Positions respectively.

This drawing illustrates 2 of the infinite positions of the Bowl Assembly relative to its Base when the Converter is operating.

Figure 6:
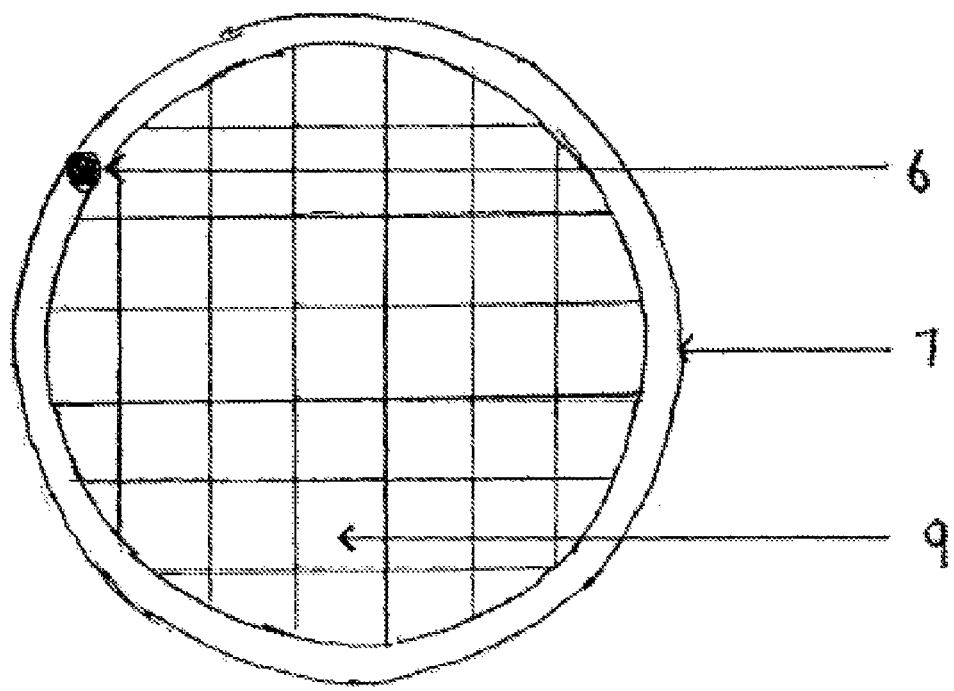

FIG. 6—Solid Ball within Hollow Circular Channel fixed onto Swash Plate

Location of one of the 2 free travelling Balls. The other being inside the Bowl Assembly.

Figure 7:
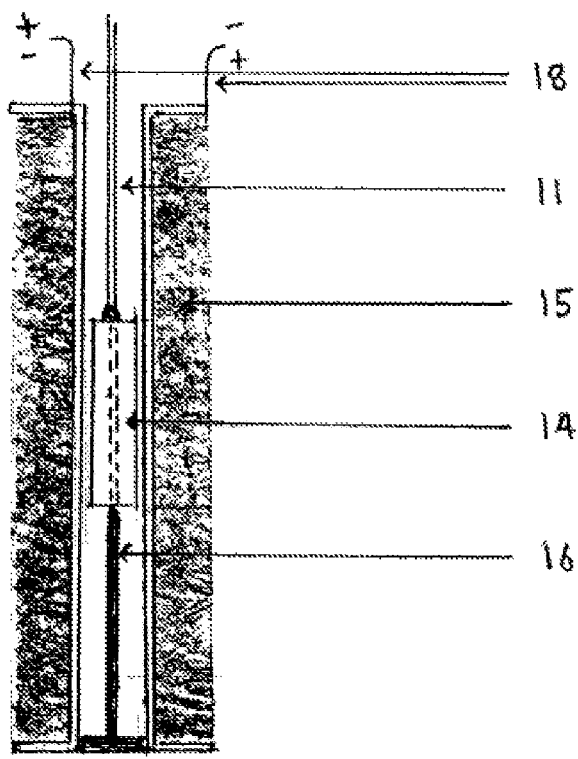

FIG. 7—Cross section of Single Unit of Removable Solenoid Core with Magnet Guide attached This is a magnified view of a single unit of the Solenoid/Magnet/Guide illustrated in FIG. 3. This is a Sub-Generator.

The invention claimed is:

1. An energy converter comprising:
an inductance AC generator for converting wave energy to electrical energy, the inductance AC generator including:
a bowl having a concave bottom;
a first ball disposed within the bowl, the ball being capable of freely moving within the bowl along the concave bottom;
a hollow circular channel disposed beneath the bowl;
a second ball disposed within the hollow circular channel and being capable of freely moving within the hollow circular channel;
a swash plate which supports the bowl assembly and the hollow circular channel and which is configured to displace in the vertical axis as a wave causes the first and second balls to undergo rotational motion and the swash plate to move in the vertical direction;
a plurality of tie rods connected at one end to the swash plate and each having a magnet disposed thereon; and
a plurality of solenoid coils configured to house the magnets of each of the plurality of tie rods, the plurality of solenoid coils configured to produce an electrical current as the magnets of the plurality of tie rods move in the vertical direction.

2. The energy converter of claim 1, wherein the energy converter produces hydroelectricity.

3. The energy converter of claim 2, wherein the hydroelectricity is produced from kinetic energy of marine waves.

4. The energy converter of claim 3, wherein the energy converter is installed at a location where there is some form of waves.

5. The energy converter of claim 4 comprising at least two sub-generators.

6. The energy converter of claim 5, wherein partial failure of components within the energy converter does not impede operations or cause complete shutdown.

7. The energy converter of claim 5, wherein the energy converter is used in a group of multiple units at a single or multiple locations.

8. The energy converter of claim 7, wherein partial failure of components within the energy converter does not impede operations or cause complete shutdown.

9. The energy converter of claim 7, wherein output of the group of multiple units can be either localized or centralized.

10. The energy converter of claim 9, wherein the group of multiple units can be incorporated into an area, state, national or international grid.

\* \* \* \* \*